United States Patent [19]

Hoey

[11] 3,887,408

[45] June 3, 1975

[54] METHOD OF FORMING PERMEABLE POLYMERIC LINER ON ABSORBENT DIAPERS, WOUND DRESSINGS, CATAMENIAL PADS AND THE LIKE

[75] Inventor: Charles E. Hoey, Marlton, N.J.

[73] Assignee: Rohm and Haas Company, Philadelphia, Pa.

[22] Filed: Apr. 24, 1973

[21] Appl. No.: 354,062

[52] U.S. Cl. ............. 156/78; 5/90; 128/287; 128/290 R; 156/163; 156/220; 156/247; 156/289; 161/160
[51] Int. Cl. ............. B32b 5/18; A61f 13/18
[58] Field of Search ........ 128/155, 156, 290 R, 287; 156/78, 160, 163, 209, 220, 247, 289, 297, 306, 312, 582, 583; 264/45, 47, 231; 161/160

[56] References Cited
UNITED STATES PATENTS

| | | | |
|---|---|---|---|
| 3,336,180 | 8/1967 | Werner | 161/89 X |
| 3,431,911 | 3/1969 | Meisel, Jr. | 128/287 |
| 3,446,685 | 5/1969 | Goldstone | 161/119 X |
| 3,496,043 | 2/1970 | Ragan | 161/116 X |
| 3,528,866 | 9/1970 | Stevens | 161/119 X |
| 3,537,947 | 11/1970 | Brazdzioris | 156/78 X |
| 3,591,401 | 7/1971 | Snyder et al. | 161/119 X |
| 3,607,341 | 9/1971 | Gains | 161/160 X |
| 3,647,607 | 3/1972 | Hillers | 161/119 X |
| 3,700,515 | 10/1972 | Terry | 161/67 X |
| 3,804,700 | 4/1974 | Hoey | 156/78 X |

FOREIGN PATENTS OR APPLICATIONS

| | | | |
|---|---|---|---|
| 250,618 | 4/1964 | Australia | 264/321 |

Primary Examiner—George F. Lesmes
Assistant Examiner—Alan T. McDonald

[57] ABSTRACT

A procedure is provided for producing a laminate having a crushed, polymeric latex foam, preferably thermoset, bonded to an absorbent layer, in turn bonded to a liquid-impermeable film. The foam-absorbent combination is self-bonded, i.e., no adhesive is used to bond them to one another. The preferred procedure is to apply a thin layer of foamed latex of a thermosettable polymer on a release medium, such as silicone release paper, and drying the same without causing thermosetting (if a thermosettable polymer is utilized). The dry foam, still on the release paper, is then suitably placed against the absorbent layer and bonded thereto and crushed by pressure. The thermosetting may be done simultaneously with bonding or subsequently thereto. The absorbent layer is preferably a non-textile, such as cotton batting, so that it disintegrates upon flushing into a sewage system.

5 Claims, No Drawings

METHOD OF FORMING PERMEABLE POLYMERIC LINER ON ABSORBENT DIAPERS, WOUND DRESSINGS, CATAMENIAL PADS AND THE LIKE

This invention relates to an absorbent article having a top layer of a crushed polymeric latex foam bonded to an absorbent layer, and in turn adhered to a flexible liquid impermeable bottom layer such as polyethylene. The laminate of the foam and absorbent medium is self-adhered or self-bonded; ie., no extraneous adhesive is needed. In the case of the waterproof film such as polyethylene, it may be wider than the wadding or other absorbent material but of a width such that the fiber and foam self-bond together.

In the past, similar laminates have been made with a permeable top layer such as adhesively bonded fibers, and even fully expanded foam such as polyurethanefoam, but the foam is either of such light weight and low density that a fabric-like hand could not be obtained, or is a dense foam provided by controlling the amount of blowing or foaming agent or controlling the extent of expansion, the product thus being relatively rubbery and non-fabric-like or stiff and inflexible and again does not have the hand of a soft fabric, or the desired porosity.

Examples of such prior materials is a polyurethane foam such as shown in U.S. Pat. Nos. 3,431,911; 3,461,872; 3,463,745; 3,512,530, and 3,563,243. It will be noted that of those patents which illustrate the foams, the open cells defined by the ribs or struts are essentially symmetrical, three-dimensionally. Thus, when stretched, as by an attempt to flush the absorbent lining and the fully expanded open-celled foam is made, the foam layer is succeptible to extensive elongation before reaching the limits of its tear strength, if at all. Such polyurethane foams tend to "rope" and clog the plumbing. On the other hand, the present invention, by making largely two-dimensional flat open cells, permits tearing of the crushed foam under moderate elongation, but provides good integrity at the low elongations (<50 percent) encountered in normal use.

In a specific preferred embodiment, a crosslinkable or thermosettable acrylic latex foam is deposited onto release paper coated with a silicone release coating, and the foam is dried without thermosetting. The latex is foamed, preferably by means of whipped in air and in the presence of a foam stabilizer, the foam is then applied to the release surface and dried without causing crosslinking. The foamed surface and the absorbent material are then juxtaposed, the foam is reduced in thickness by pressure, with or without embossing a design in the laminate, and then heated to a temperature sufficiently high to crosslink and thermoset the polymers. The absorbent medium, or the means used to bond it to the waterproof film, is such as to have the bond destroyed when the film is held and the structure dipped in water. The foam is initially foamed to a wet foam density of about 0.05 to 0.5 grams per cubic centimeter and is applied in a thickness of from about 4 to 45 mils, preferably no more than 30 mils. The density, of course, will vary with the presence or absence of pigments and fillers and their identity. The foam is then dried without causing thermosetting, crosslinking, or vulcanization to a sensibly dry condition, for example, to an air-dry or sensibly dry state, for example, by heating at a temperature below that which causes said thermosetting, crosslinking, or vulcanization, an example being from 1 to 10 minutes at an oven temperature of 200°–350°F., followed preferably after having placed the absorbent material and the surface of the foam together, by crushing the foam to a thickness between 5 and 35 percent of its original dry thickness to give a density of about 0.2 to 3g./cc.³, followed by curing of the crushed foam. In general, the thickness of the dried foam prior to crushing may be substantially less than that of the wet foam, there at times being some shrinkage. This shrinkage is in the range of 0 to 30 percent of the thickness of the wet foam being lost during drying. Suitable moisture contents range from 5 percent to 15 or 20 percent in order to qualify as air dry or sensibly dry materials. The criteria as to moisture content is that the foam must be stable enough to be self-bonded to the absorbent material. In some cases crosslinking may be accomplished by catalysis rather than primarily by the application of heat. Of course, the foam may be crushed before it is self-bonded to the absorbent material, but in this case a crushing roll having a release coating such as a silicone or Teflon is desirable. Normally no adhesive is needed between the foam and the absorbent layer, since preferably a thermosetable foam is used, and the final curing of the foam causes a firm bond between the layers.

Of course, a thermoplastic foam may be used. Crushed foam is essential, since if the initial foam is formed to the final density by control of the amount of foaming agent or by means such as using a chemical blowing agent and restraining the expansion in order to get the final density, the walls or struts connecting the air spaces are relatively thick. A crushed foam, on the other hand, initially having expanded to a number of times its final thickness, has thin connective walls or struts. The result is that the crushed foam is much more flexible and fabric-like than a foam initially expanded to the density noted above. These foams are inherently opaque. The opacity can be compared with the opacity of whipped egg whites; the liquid egg white is substantially transparent and the gas cells incorporated therein confer opacity of whipped egg whites; the liquid egg white is substantially transparent and the gas cells incorporated therein confer opacity upon the whipped froth.

When pigmented compositions are contemplated, examples of the pigments that may be employed include clays, especially of the kaolin type, calcium carbonate, blanc fixe, talc, titanium dioxide, colored lakes and toners, ochre, carbon black, graphite, aluminum powder or flakes, chrome yellow, molybdate orange, toluidine red, copper phthalocyanines, such as the "Monastral" blue and green lakes. If dyed compositions are used, examples of dyes for acrylic film and foam include basic and dispersed dyes. Other composites could be made dyeable, if not inherently so, through the use of additives such as methyl cellulose, hydroxyl ethyl cellulose, and the like. Other dyes which could be used include acid dyes, vat dyes, direct dyes, and fiber reactive dyes.

An important advantage in utilizing a dried but uncured foam of a crosslinkable polymer and an absorbent layer such as an opened cellulosic batt is that the two elements can be passed through the nip of a pair of rollers, the distance between which is small enough to "marry" the two but insufficient to crush the dried foam, all without using an adhesive to bond the foam.

Of course, bonding of the dry foam and the absorbent material can be done at a pressure sufficient to crush the foam with or without embossing the same. Even after crushing, the foam has sufficient resilience to be embossed with a patterned roller. If desired, the embossing roller may be heated to the curing temperature of the foam.

For a description of suitable conventional foaming procedures and foam stabilizers and foaming agents, reference is made to Mage, E. W., "Latex Foam Rubber," John Wiley and Sons, New York (1962) and Rogers, T. H., "Plastic Foams," Paper, Reg. Tech. Conf., Palisades Sect., Soc. Plastics Engrs., New York, Nov., 1964. Most common are the alkali metal, ammonia, and amine soaps of saturated or unsaturated acids having, for example, from about 12 to about 22 carbon atoms. Examples of suitable soaps include tallow soaps and coconut oil soaps, preferably the volatile amine or ammonia soaps, so that the volatile portion is vaporized from the foam. Other useful foaming-foam-stabilizing agents include lauryl sulfate-lauryl alcohol, lauryl sulfate-lauric acid, sodium lauryl sulfate, and other commonly used foamed stabilizers or foaming agents.

The latex, when formulated with the foam stabilizer and optionally, suitable pigments, is readily convertible into the foamed state. The polymer composition is such that excessive thickening of the formulation is not encountered under the acid or alkaline conditions employed to assure the most efficient operation of the foam stabilizing agent. In addition the copolymer is such that the crushed foam retains its softness and its flexibility at low temperatures at least to a temperature as low as 10°F., and after curing is non-tacky.

Important properties of the copolymer are its toughness and flexibility and the minimum film-forming temperature (MFT) of the formulated coating composition, both dependent in large part upon the influence of its monomer composition. The glass transition temperature (Tg) of the copolymer depends upon the selection of monomers and proportions thereof because of their influence on the Tg. "Tg" is a conventional criterion of polymer hardness and is described by Flory, "Principles of Polymer Chemistry," pp. 56 and 57, (1953), Cornell University Press. While actual measurement of the Tg of copolymers may be made, it may be calculated as described by Fox, Bull. Am. Physics Soc. 1, 3, p. 123 (1956). Examples of the Tg of high molecular weight homopolymers and the inherent Tg thereof which permits such calculations are as follows:

| Homopolymer of | Tg |
| --- | --- |
| n-octyl acrylate | −80° C. |
| n-decyl methacrylate | −60° C. |
| 2-ethylhexyl acrylate | −70° C. |
| octyl methacrylate | −20° C. |
| methyl acrylate | −9° C. |
| n-tetradecyl acrylate | 20° C. |
| methyl methacrylate | 105° C. |
| acrylic acid | 106° C. |

These or other monomers are blended to give the desired Tg of the copolymer. As is known, for a given number of carbon atoms in the alcohol moiety, the extent and type of branching markedly influences the Tg, the straight chain products giving the lower Tg.

One of the monomers utilized to prepare the water-insoluble addition copolymer is a flexibilizing or "soft" monomer which may be represented by the following formula:

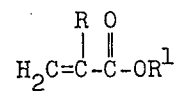

wherein R is H or alkyl having 1 to 4 carbon atoms and $R^1$ is the straight chain or branched chain radical of a primary or secondary alkanol alkoxyalkanol or alkylthiaalkanol, the alkanol having from 2 to about 14 carbon atoms, the chain length depending upon the identity of R, examples being ethyl, methylpropyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-cotyl, 6-methylnonyl, decyl, dodecyl, and the like. When R is alkyl and $R^1$ is alkyl, $R^1$ should have from about 6 to about 14 carbon atoms and when R is H and $R^1$ is alkyl, $R^1$ should have from 2 to about 12 carbon atoms, in order to qualify as a soft monomer.

In addition to the flexibilizing monomer, the other essential monomers are the "toughening" or "hard" monomers, discussed in greater detail below and including, for example, monovinyl aromatic monomers, certain acrylic acid and/or methacrylic acid esters, vinyl halides, vinyl nitriles, and, if used, the monomers having hydroxyl, carboxyl, amino, amido, epoxy, or other functionality described below. The hardness or softness of the acid and other functional monomers is not critical because of the small amounts used. Styrene and vinyltoluene are examples of the monovinyl aromatics.

The unsaturated carboxylic acid, the preferred functional monomer, may be a simple monocarboxylic acid, or may be a half ester or half amide of an $\alpha,\beta$-unsaturated dicarboxylic acid, and salts thereof with a volatile base such as ammonia, or with a volatile water-soluble amine such as dimethylamine, triethylamine, triethanolamine, morpholine, N-methyl morpholine, picoline, and the like. Examples of copolymerizable ethylenically unsaturated monocarboxylic or polycarboxylic acids are sorbic, cinnamic, vinyl furoic, $\alpha$-chlorosorbic, p-vinylbenzoic, acrylic, methacrylic, maleic, fumaric, aconitic, atropic, crotonic, and itaconic acid, or mixtures thereof, with itaconic acid and the $\alpha,\beta$-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "$\alpha,\beta$-unsaturated monocarboxylic acids," and the term as used herein includes such esters and amides.

In addition to or in place of the acids, amides such as acrylamide and methacrylamide, 2-sulfoethyl methacrylate, the materials disclosed in U.S. Pat. Nos. 3,446,777 to W. D. Emmons, 3,150,118 to D. H. Clemens, and 3,266,930 to W. D. Emmons and E. Hankins Owens, and various other functional, polar, or monomers having groups which remain reactive after the polymer is formed, for example, falling within the definitions of formulas II, III, IV, V, and VI, are also useful, as follows:

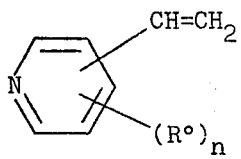

(II)

where R° is selected from the group consisting of H and alkyl groups having 1 to 4 carbon atoms, and
n is an integer having a value of 1 to 4,

(III)

where R is selected from the group consisting of H and CH$_3$,

A is selected from the group consisting of O, S,

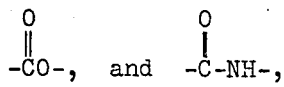

Y is an alkylene group having 2 to 4 carbon atoms,
R$^1$ is selected from the group consisting of H and an alkyl group having 1 to 4 carbon atoms, and
R$^2$ is selected from the group consisting of H and an alkyl group having 1 to 4 carbon atoms,

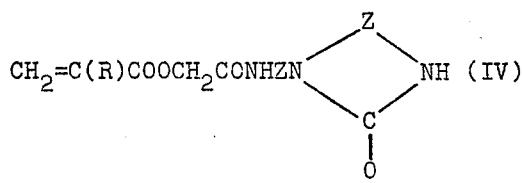

where R is the same as above, and Z is an alkylene group having 2 to 3 carbon atoms.

Examples of compounds of formula II include: 2-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine.

Examples of compounds of formula III include: dimethylaminoethyl acrylate and methacrylate; diethylaminoethyl acrylate and methacrylate; dimethylaminopropyl acrylate and methacrylate; diethylaminopropyl acrylate and methacrylate; dipropylaminoethyl acrylate and methacrylate; di-n-butylaminoethyl acrylate and methacrylate; di-sec-butylaminoethyl acrylate and methacrylate; di-t-butylaminoethyl acrylate and methacrylate; dimethylaminoethyl vinyl ether and sulfide; diethylaminoethyl vinyl ether and sulfide; aminoethyl vinyl ether and sulfide; monomethylaminoethyl vinyl ether and sulfide; N,N-dimethylaminoethyl acrylamide and methacrylamide; N,N-diethylaminoethyl acrylamide and methacrylamide.

Examples of compounds of formula IV include:
N-[β-(α-methacryloxyacetamido)ethyl]-N,N'-ethyleneurea;
N-[β-(α-acryloxyacetamido)ethyl]-N,N'-ethyleneurea;
N-[β-(α-acryloxyacetamido)ethyl]-N,N'-trimethyleneurea;
N-[β-(α-methacryloxyacetamido)ethyl]-N,N'-trimethyleneurea.

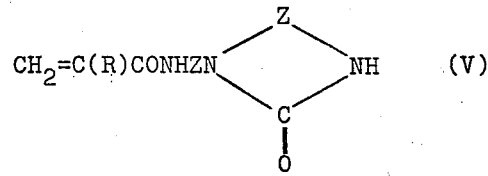

(V)

where R and Z are as defined above, of which an example is N-[β-(methacrylamido)ethyl]-N,N'-ethyleneurea.

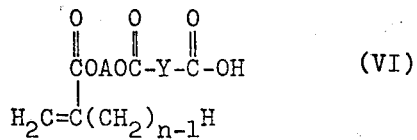

(VI)

wherein
A is an alkylene group having 2 to 10 carbon atoms, preferably 2 to 3 carbon atoms, of which at least 2 extend in a chain between the adjoining oxygen atoms,
Y is selected from the group consisting of

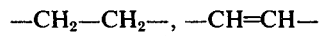

and ortho-phenylene, and
n is an integer having a value of 1 to 2.

Examples of compounds of formula VI include methacryloxyisopropyl acid maleate, methacryloxyethyl acid phthalate, methacryloxypropyl acid succinate, methacryloxydecyl acid succinate, and metharyloxyoctyl acid phthalate.

As noted above, in addition to the importance of Tg, the coating composition of the invention has a critical MFT. MFT is determined by the method described in Resin Review, Volume 16, No. 2 (1966), with the following modification. The MFT Of a conventional latex is quite easy to identify visually on a thin film that is deposited on a temperature gradient bar. It is the temperature at which film cracking ceases and the film becomes continuous and clear. However, with the heat-fusible latices of this invention, deposited films are relatively free of cracking over the entire temperature range. Visually, the heat-fusible latices display a more gradual transition from opaque film to translucent film to clear-film as one proceeds toward the high temperature end of a temperature gradient bar. Consequently, the visual observations are augmented by scraping at the deposited film with a sharp instrument, such as the edge of a metal spatula, to determine the temperature at which the deposited film achieves good strength and integrity. This allows a more definite identification of the temperature at which there is a transition from a translucent film to a clear, continuous film, that is, the MFT as defined for heat-fusible coating compositions. This is influenced not only by the Tg of the addition copolymer, but by polymer composition and other ingredients such as plasticizers or coalescing agents, if used, and their amounts.

While the preferred polymers are thermoplastic, crosslinkable or thermosetting polymers, those subject to latent crosslinking are also useful.

There are essentially two types of latent crosslinking which can be used. These are (1) crosslinking subsequent to polymerization by including monomers in the polymer recipe which have functional groups capable of crosslinking by various mechanisms including self-crosslinking, or mutual crosslinking by different functional groups, both in the polymer chains, and (2) latent crosslinking by means of an external separately added chemical compound. Combinations can be used.

Where addition polymers are involved, monomers which are suitable for latent crosslinking include certain acrylics having crosslinkable functionality exemplified below.

Examples of the crosslinking reactions which are possible using heat, aging, and/or catalysis are:

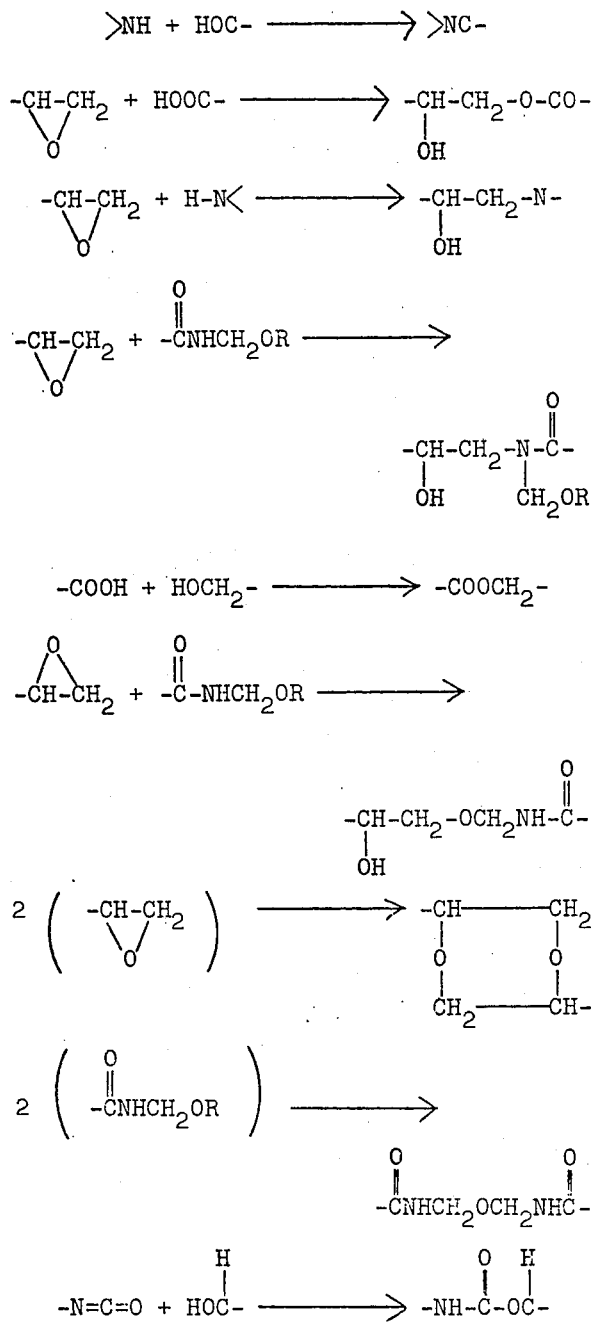

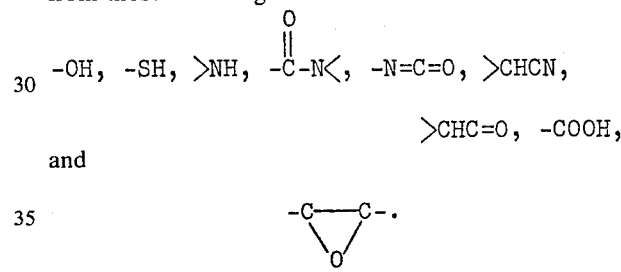

In the above, R is H or $CH_3$. Addition polymerizable unsaturated monomers containing such groups are well known in the art, examples being isocyanates such as isocyanatoethyl methacrylate, epoxy compounds such as glycidyl methacrylate, aminoalkyl compounds such as methylaminoethyl methacrylate, and t-butylaminoethyl methacrylate, amides such as methacrylamide, guanamines such as 4-pentenoguanamine, hydroxyalkyl esters such as hydroxypropyl methacrylate and hydroxyethyl methacrylate, nitriles such as methacrylonitrile, N-alkoxyalkyl amides such as methoxymethyl methacrylamide, hydroxyalkyl amides such as N-methylol methacrylamide, the analogs of the above methacrylic acid derivatives with other unsaturated acids such as acrylic acid and itaconic acid, such acids themselves, dicarboxylic acids such as maleic acid and half esters and half amides thereof, vinyl ethers of glycols such as ethylene glycol, and so forth.

The crosslinkable addition polymerizable unsaturated monomers have reactive polar groups selected from those including $-OH$, $-SH$, $>NH$, $-\overset{O}{\underset{\|}{C}}-N<$, $-N=C=O$, $>CHCN$, $>CHC=O$, $-COOH$, and $-\overset{}{C}\underset{\underset{O}{\diagdown\diagup}}{\text{---}}\overset{}{C}-$.

Such groups may be included as are mutually or self-crosslinkable, or separate crosslinking compounds such as a triazine-formaldehyde resin may be added, as is well known.

Of course, water sensitive materials such as isocyanates should not be used in aqueous systems unless they are blocked by groups such as phenol groups which protect the isocyanate groups until subsequent heating or the use of other reaction mechanisms such as the use of a calcium, zinc, or tin compound catalyst conventional in the art.

The separate added crosslinker, when used, is useful with or without the use of mutual crosslinking groups and self-crosslinking groups. Among the external crosslinking methods or compounds is the use of organic peroxides such as benzoyl peroxide; the use of epoxy resins such as that obtained from bis-phenol A and epichlorohydrin; esterification, by means of dicarboxylic acids reacting with hydroxyl groups in the polymers, or by reacting diols or polyols such as neopentyl glycol, trimethylol propane, trimethylol ethane, or ethylene glycol with carboxyl groups in the polymer; use of aminoplasts such as melamine formaldehyde, urea formaldehyde, or butylated melamine formaldehyde; diamines and polyamines such as hexamethylene diamine, ethylene diamine, and the Versamids; polyisocyanates such as toluylene diisocyanate; compounds with mixed functionality such as ethanolamine, and other well-known external crosslinkers.

Other ethylenically unsaturated copolymerizable monomers present are the "hard" or toughening monomers. These may be represented by the formula:

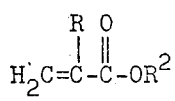

wherein R is as above. $R^2$ is preferably alkyl and is methyl or alkyl having from about 13 to about 20 carbon atoms when R is H, and is alkyl of from 1 to about 5 carbon atoms or alkyl of from about 15 to about 20 carbon atoms when R is methyl. It can be seen from above that for alkyl acrylates and alkyl methacrylates the Tg at first decreases with an increased chain length of the alkyl group and then the Tg again increases; i.e., both hard and soft monomers are known to occur in each group of esters. Examples of these hard monomers and other hard monomers include: methyl acrylate, vinyl acetate, tetradecyl acrylate, pentadecyl acrylate, methyl methacrylate, ethyl methacrylate, t-butyl acrylate, styrene, vinyltoluene, butyl methacrylate, and pentadecyl methacrylate.

The coating compositions are useful as clear coatings or they may be pigmented with a variety of pigments as set forth hereinafter.

Minimal amounts of the functional monomers discussed heretofors having hydroxyl, carboxyl, amino, amido, or epoxy groups and the like, when used, are beneficial in promoting adhesion and in some cases providing thermosettability. The maximum proportion of such monomers based on total monomers is 10 percent, preferably a maximum of about 5 percent. Excessive amounts of some of these monomers contribute to hydrophilicity of the polymer; if the polymer is excessively hydrophobic or hydrophilic, coatings therefrom may have undesirable properties.

If it is desired to increase the viscosity of these latices, they may be readily thickened with various thickeners such as the water-soluble gums. Thus, the ammonium or lower amine salts of polycarboxylic acids are suitable, and typical examples are ammonium polyacrylate, ammonium polymethacrylate, the salts of polyacrylic and polymethacrylic acids with mono-, di-, and trimethylamine, the salts of polyacrylic and polymethacrylic acids with mono-, di-, and triethylamine, etc.

The preferred emulsion copolymers, for the foam has a molecular weight of between about 70,000 and 2,000,000, and preferably between about 250,000 and 1,000,000 and are made by the emulsion copolymerization of the several monomers in the proper proportions. Conventional emulsion polymerization techniques are described in U.S. Pat. Nos. 2,754,280 and 2,795,564. Thus, the monomers may be emulsified with an anionic, a cationic, or a nonionic dispersing agent, about 0.05 to 10 percent thereof ordinarily being used on the weight of the total monomers. The acid monomer and many of the other functional or polar monomers may be soluble in water so that the dispersing agent serves to emulsify the other monomer or monomers. A polymerization initiator of the free-radical type, such as ammonium or potassium persulfate, may be used alone or in conjunction with an accelerator, such as potassium metabisulfite, or sodium thiosulfate. Organic peroxides, such as benzoyl peroxide and t-butyl hydroperoxide are also useful initiators. The initiator and accelerator, commonly referred to as catalyst, may be used in proportions of 0.1 to 10 percent each based on the weight of monomers to be copolymerized. The amount, as indicated above, may be adjusted to control the intrinsic viscosity of the polymer. The temperature may be from room temperature to 60° C. or more as is conventional.

Suitable dispersing agents useful in emulsion polymerization include anionic types such as the sodium salts of the higher fatty acid sulfates, such as that of lauryl alcohol, the higher fatty acid salts, such as the oleates or stearates or morpholine, 2-pyrrolidone, triethanolamine or mixed ethanol-amines, or any of the nonionic types, such as ethylene oxide-modified alkyl phenols, of which tert-octyl phenol modified by 20 to 40 ethylene oxide units is representative, ethylene oxide-modified higher fatty alcohols such as lauryl alcohol, containing 20 to 50 ethylene oxide units, similarly modified long-chain mercaptans, fatty acids, amines, or the like. Mixtures of nonionic and anionic dispersing agents are also useful.

The elements of the pad, in addition to the crushed foam, are the liquid-impermeable film and the absorbent material.

Suitable flexible liquid-impermeable films include polyolefins such as polyethylene and polypropylene, saran, and the like.

Among useful absorbent materials, preferably nontextile materials, held between the impermeable film and the crushed foam; are cellulosic waddings made from wood pulp, cotton or rayon; carded, garnetted or otherwise opened wood pulp, cotton or rayon fibers, crepe paper or tissue paper layers and even hydrophobic fibers which give a capillary effect, such as polyolefins, polyesters, acrylics, polyvinyls and the like, spongy materials, etc.

EXAMPLE 1

An emulsion copolymer dispersion prepared from 2,575 parts deionized water, 87 parts sodium lauryl sulfate, 90 parts acrylic acid, 315 parts acrylamide, 900 parts acrylonitrile, and 7,695 parts n-butyl acrylate is compounded in the following formulation:

|  | Product | Solids |
|---|---|---|
| Dispersion | 200 | 100 |
| Titanium Dioxide (Titanox RA-45) | 25 | 25 |
| Clay (Acme WW) | 30 | 30 |
| Malamine-Formaldehyde Resin (Aerotex MW) | 4.6 | 3.7 |
| Ammonium Stearate | 14 | 4.6 |
| Water | 70 | — |
| Ammonia (28%) | 4 | — |
|  | 347.6 | 163.3 |
| Solids - 47.0% | | |

All parts and percentages are by weight unless otherwise stated.

Foam is made by whipping air into the formulation using a Kitchen-Aid Mixer (Model C) to a wet density of about 0.16 g. cm.³. The foam is then cast at 40 mils onto release paper and dried for 1.75 minutes at 280° F. to give a dry foam. This is then placed with the foam side adjacent a opened (fluffed) absorbent wood pulp but laying loosely on a polyethylene film of about the same width as the foam. The release paper is then peeled off. The laminate is then passed between rollers heated to 250°–300° F. This crushes the dry foam to about 8 mils thick, and firmly bonds the foam to the wadding. To achieve more complete crosslinking of the foam and film, the composite is heated in an oven for 2 minutes at 300° F.

The crushed foam has a cold-flex temperature of −15° F.

EXAMPLE 2

Example 1 is repeated except that 135 parts of itaconic acid, 315 parts of acrylamide, 5,850 parts of ethyl acrylate, 405 parts of acrylonitrile and 2,305 parts of n-butyl acrylate are used as the monomers for the foam.

EXAMPLE 3

Example 1 is repeated except that for the foam 675 parts of acrylonitrile and 2,035 parts of n-butyl acrylate are used. The resultant crushed foam has a cold-flex temperature of 15° F.

EXAMPLE 4

Example 1 is repeated except that 180 parts of acrylic acid, 315 parts of acrylamide, 900 parts of acrylonitrile and 7,605 parts of n-butyl acrylate are used as the monomers, for the foam.

EXAMPLE 5

Example 1 is repeated except that 45 parts of acrylic acid, 315 parts of acrylamide, 1,800 parts of acrylonitrile and 6,840 parts of n-butyl acrylate are used as the monomers, for the foam.

EXAMPLE 6

Example 1 is repeated but the monomers for the foam consist of 270 parts methacrylic acid, 180 parts acrylamide, 375 parts acrylonitrile, 2,250 parts butyl acrylate, and 5,925 parts ethyl acrylate.

EXAMPLE 7

The procedure described in Example 6 is repeated except the methacrylic acid is replaced with 45 parts of itaconic acid and the amount of butyl acrylate is changed to 2,475 parts.

EXAMPLE 8

The procedure described in Example 1 is followed with an emulsion polymer of 170 parts itaconic acid, 200 parts methacrylic acid, 135 parts acrylamide, 450 parts acrylonitrile, 2,700 parts butyl acrylate, and 3,485 parts ethyl acrylate, to prepare the foam.

EXAMPLE 9

The procedure described in Example 1 is carried out with an emulsion polymer of 135 parts methacrylic acid, 180 parts acrylamide, 630 parts acrylonitrile, 5,400 parts butyl acrylate, and 3,655 parts isopropyl acrylate.

EXAMPLE 10

Example 1 is repeated with an emulsion polymer of 135 parts itaconic acid, 270 parts acrylamide, 630 parts acrylonitrile, 5,400 parts butyl acrylate, 1,285 parts ethyl acrylate, and 1,285 parts methyl acrylate, as the foam. Similar results are obtained when isobutyl acrylate of 2-ethylhexyl acrylate are used in place of butyl acrylate or ethyl acrylate.

EXAMPLE 11

Example 1 is repeated with latices of polymers having the composition.
a. 86EA/10AN/2MIAM/2AM
b. 65EA/25.5BA/4.5AN/3.5AM/1.5IA
c. 96EA/2MIAM/2AM
d. 48EA/48BA/3MIAM/1IA with the wet density of between about 0.1 to 0.5 g./cm³ at wet thicknesses between about 4 mils and 45 mils. Polymer (a) is relatively hydrophilic, (b) and (c) moderately so, and (d) relatively hydrophobic. All quickly absorbed pipetted water. The lower thicknesses tend to provide a textile-like feel whereas the higher thicknesses give a plastic-like feel.

At a wet density of about 0.18 g./cm³ (about 11 lb./ft.³) the crushed density is about 20–40 lbs./ft.³ (but variable because of intertwining with the cotton fiber of this batting used). Pore sizes of the dried cured crushed foams, on the exposed horizontal face, of this wet density (about 0.18 g./cm³) are about 1–5 mils with about $10^2$ to $3 \times 10^2$ pores per linear inch and $10^4$ to $10^5$/in.²

EXAMPLE 12

The following crushed foam formulation was prepared:

|  | Product | Solids |  |
|---|---|---|---|
| Latex | 100 | 50 | 65EA/25.5BA/4.5AN/3.5AM/1.5IA |
| TiO₂ (50% dispersion) | 25 | 12.5 |  |
| Acme WW Clay | 15 | 15 |  |
| H₂O | 18.7 | — |  |
| Aerotex MW | 2.3 | 1.8 | Melamine-formaldehyde resin |
| Ammonium Stearate | 7.0 | 2.3 |  |
| NH₄OH (28%) | 2.0 | — |  |
|  | 170.0 | 8.16 | Solids - 48.0% |

Foams are made by whipping air into the formulation using a Kitchen-Aid Mixer (Model C) to a density of about 0.18 ±0.01 g. cm⁻³. The foam is then cast at either 45 mils or 7 mils wet on release paper and then dried for 2 minutes or ½ minute, respectively, at 280° F. The foam (still on the release paper) is placed over wadding on polyethylene and the sandwich passed through crush rolls at 60lb. pressure. The release paper is peeled away and the composite cured at 280°F for 5 minutes.

The samples are then compared to a commercial product for feel, for rate of absorbence of 5 ml. of water pipeted onto the surface, for surface feel after the water is absorbed (by pressing a palm on the surface) and for wet abrasion resistance by rubbing the wet spot with a forefinger.

The heavy foam add-on (~2.5 oz/yd²) feels plastic-like but the light add-on (~0.5 oz/yd²) has a feel more textile-like than the commercial products papery feel. All absorbed the water rapidly and feel damp, not wet, after it is absorbed into the nonwoven. All have good wet abrasion resistance; in fact, only after the wadding is moved aside by the rubbing did any of the covers fail. In all respects the low foam add-on appears comparable to the commercial product except it has an improved textile feel.

The following explains the abbreviations used in the foregoing examples.

| | |
|---|---|
| EA | ethyl acrylate |
| BA | butyl acrylate |
| AN | acrylonitrile |
| MIAM | methylolacrylamide |
| AM | acrylamide |
| IA | itaconic acid |

I claim:

1. In a process of making a flexible absorbent pad comprising a top layer of soft polymeric foam material prepared from an ethylenically unsaturated acrylic monomer which is permeable to liquids, an underlying layer of liquid-absorbent material, and a bottom film of flexible moisture-impervious material, the improvement comprising foaming said polymer in the form of an aqueous latex, applying it to the absorbent layer, the foam having a wet density of about 0.1 to about 0.5 grams per cm³ and a wet thickness of about 4 mils to about 45 mils, drying the foam without substantially reducing its thickness and crushing the foam to a thickness of between about 5 percent and about 35 percent of the thickness of the original wet foam material, whereby a textile-like laminate is obtained, the foam in dry form being collapsed.

2. The process of claim 1 in which the wet foam is deposited on a silicone coated release paper and dried thereupon, the foam is then applied to the absorbent layer, and the composite passed through crushing rolls at a pressure sufficient to give said reduction in thickness, followed by curing the foam with heat.

3. The process of claim 1 in which the polymeric foam is of a polymer which is crosslinkable or thermosettable, the pore density on the horizontal face of the crushed foam is about 100,000 to 1,000,000 per square inch, and the thickness of the cured crushed foam layer is from about 2 mils to about 10 mils.

4. The process of claim 3 in which the crosslinking or thermosetting compound or monomer has at least one group of the structure

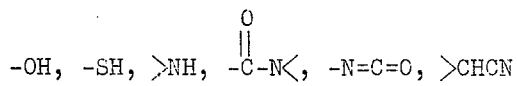

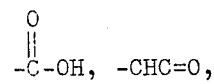

and

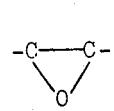

5. The process of claim 4 in which the foam is an acrylic foam made from at least one of an ester of acrylic or methacrylic acid and in which the monomers copolymerized therein comprise a small portion of at least one acrylamide, methacrylamide, methylolacrylamide, itaconic acid, acrylic acid, or methacrylic acid.

* * * * *